No. 608,715. Patented Aug. 9, 1898.
R. I. ROMAN.
JOINTING FOR TUBES.
(Application filed Dec. 20, 1897.)
(No Model.)
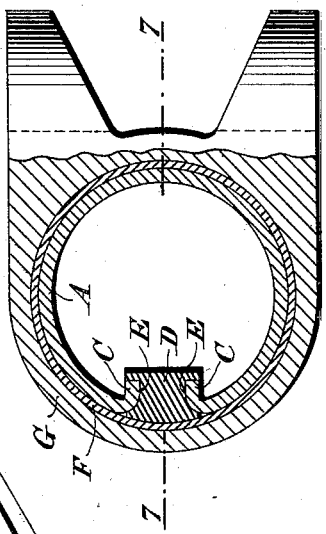
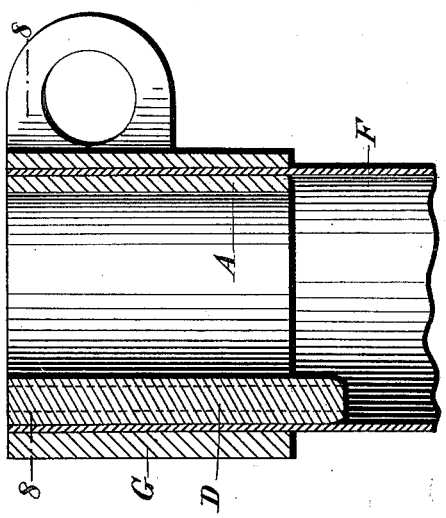
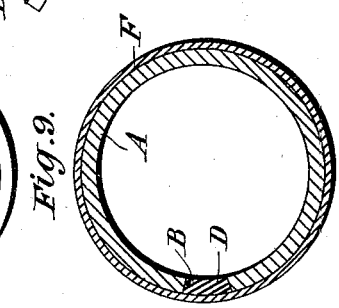
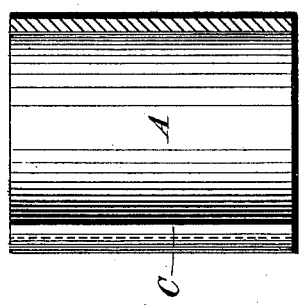
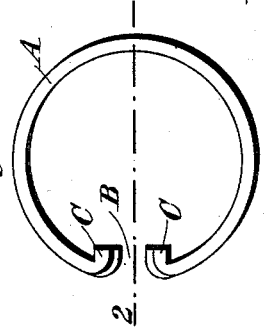
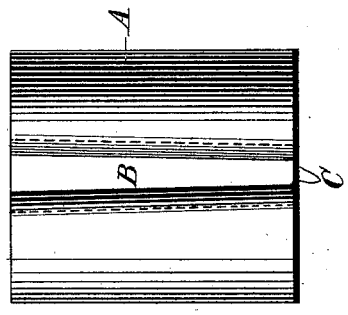
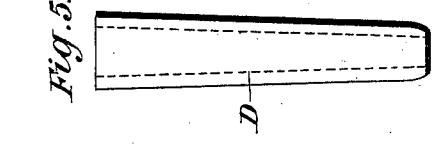
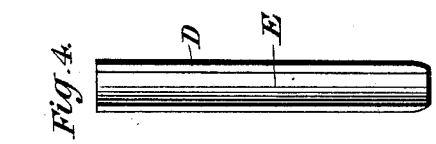
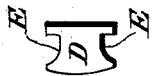
WITNESSES:
Fred White
Thomas F. Wallace
INVENTOR
Reinhard Isidore Roman,
By his Attorneys:
THE NORRIS PETERS CO., PHOTO-LITHO., WASHINGTON, D. C.

UNITED STATES PATENT OFFICE.

REINHARD ISIDORE ROMAN, OF LONDON, ENGLAND.

JOINTING FOR TUBES.

SPECIFICATION forming part of Letters Patent No. 608,715, dated August 9, 1898.

Application filed December 20, 1897. Serial No. 662,535. (No model.) Patented in England August 20, 1897, No. 19,272, and in Belgium September 16, 1897, No. 130,697.

*To all whom it may concern:*

Be it known that I, REINHARD ISIDORE ROMAN, of London, England, have invented certain new and useful Improvements in the Jointing of Tubes, (for which I have obtained Letters Patent in Great Britain, No. 19,272, bearing date August 20, 1897, and in Belgium, No. 130,697, bearing date September 16, 1897,) of which the following is a specification.

This invention relates to the jointing of tubes and is particularly applicable for the jointing of tubes in the manufacture of cycles.

The great difficulty experienced hitherto in building cycles in a suitable light aluminium alloy has been the impossibility of making a good joint.

The brazing or soldering of aluminium alloys has so far proved absolutely unreliable.

The soldering and brazing of steel is a great disadvantage, as the seamless hard-drawn tubes are annealed by the brazing heat and are consequently weakened just in those places where the greatest strength is required.

Of late years various kinds of joints to avoid brazing have been tried, but so far without success. Wedged liners, disked liners, screws, double-cut threads, and many other systems have all been found after a short use to run loose and thereby expose the cycle-rider to dangerous accidents.

Long and persevering experiments have led me to devise the improved method hereinafter described of jointing tubes in sockets without brazing, riveting, or pegging, so that the joint can easily be made and also as easily undone, even by inexperienced hands.

This invention, which is applicable not only to the jointing of cycle-tubes, but also of other metallic tubes, consists of an expansible spring ring or thimble formed with a longitudinal tapered slit and of a tapered key to enter the tapered slit of said ring or thimble. The spring-ring is approximately of the same diameter as the tube to be jointed and is inserted into the tube when the latter is in the socket in which it is to be fixed. The tapered key is then driven endwise into the tapered slit, and the spring-ring is thereby expanded against the inner wall of the tube and effectually locks the tube in its socket. The edges of the slit in the spring-ring are preferably turned inward, and the key is preferably grooved at the sides to receive the said turned-in edges. The tube and the socket or the like in which it is to be fixed should have smooth and even surfaces, and these are preferably polished. The spring-ring should also have a smooth and preferably polished external surface.

In the accompanying drawings, Figure 1 is a side view of the longitudinally-slit ring in the preferred form of my invention. Fig. 2 is a section of the same in the line 2 2 of Fig. 3. Fig. 3 is an end view of the same. Fig. 4 is a side view of the key in the preferred form of my invention. Fig. 5 is a face view of the same. Fig. 6 is an end view of the same. Fig. 7 is a section on the line 7 7 of Fig. 8, illustrating a joint made according to my invention by means of the slit ring shown in Figs. 1, 2, and 3 and the key shown in Figs. 4, 5, and 6. Fig. 8 is a section of the joint on the line 8 8 of Fig. 7, but with the socket-lugs not in section. Fig. 9 is a transverse section illustrating a modified construction of the joint. Fig. 10 is a perspective view of the key used in the joint shown in Fig. 9.

Referring first to Figs. 1 to 8, A is the expansible ring or thimble, and B the tapered longitudinal slit therein. C C are the turned-in edges of the slit. D is the tapered key, and E E the grooves in the sides of same. F represents the tube to be jointed, and G the socket or the like to which said tube has to be jointed.

When it is required to make the joint, the tube F is put in position in the socket G. The slit ring A is next put into the tube F, and then the key D is inserted with its narrow end into the wider end of the slit B in the ring A, the turned-in edges C C entering the grooves E E. The key D is then forced in as far as it will go, the effect of which is to expand the ring A against the inner wall of the tube F and to securely lock or fix this tube in the socket G. The ring A is expanded throughout its length and produces an equal pressure over the entire surface of that part of the tube which is within the socket. The pressure produced is calculated to be generally about two thousand five hundred pounds per square inch of surface, so that the jointed parts become like one solid piece of metal.

In the modification shown in Figs. 9 and 10 the edges of the slit ring A are not turned inward and the tapered key D is not grooved.

The advantages which are obtained by the use of my improved joints for parts made of light aluminium alloys and other metals used in cycles and similar constructions are—

First. The joint can be easily made and separated when required.

Second. The metal used for the joint being neither annealed nor oxidized by heating is not weakened and therefore can be used in considerably thinner gages, and therefore cycles can be made much lighter.

Third. By avoiding brazing the manufacture is rendered much cheaper and much more expeditious.

What I claim, and desire to secure by Letters Patent, is—

1. A means for jointing or fixing a tube to a socket, comprising in combination with the tube and socket, an expansible ring having a longitudinal tapered slit, and a tapered key entering said slit and adapted when driven home to expand the ring within the tube and thereby to forcibly enlarge the tube into intimate contact with the socket.

2. The combination with a tube and a part G to which it is to be fixed, having a socket into which the tube closely fits, of an expansible ring A having a longitudinal tapered slit, with the edges of the slit turned inward, and a tapered key D entering said slit and having longitudinal grooves at the sides for receiving said turned-in edges, and adapted when driven home to expand the ring within the tube and thereby to forcibly enlarge the tube into intimate contact with the socket.

In witness whereof I have hereunto signed my name in the presence of two subscribing witnesses.

REINHARD ISIDORE ROMAN.

Witnesses:
THOMAS LAING WHITEHEAD,
WILLIAM HENRY McLAUCHLAN.